(12) United States Patent
Lai et al.

(10) Patent No.: US 10,546,619 B2
(45) Date of Patent: *Jan. 28, 2020

(54) ELECTROSTATIC DISCHARGE CIRCUIT

(71) Applicant: eMemory Technology Inc., Hsin-Chu (TW)

(72) Inventors: Chih-Wei Lai, Taipei (TW); Yun-Jen Ting, Zhubei (TW); Hsin-Kun Hsu, Zhubei (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 289 days.

This patent is subject to a terminal disclaimer.

(21) Appl. No.: 15/663,948

(22) Filed: Jul. 31, 2017

(65) Prior Publication Data

US 2018/0316185 A1   Nov. 1, 2018

Related U.S. Application Data

(60) Provisional application No. 62/490,612, filed on Apr. 27, 2017.

(51) Int. Cl.
*H02H 9/04* (2006.01)
*G11C 7/22* (2006.01)
(Continued)

(52) U.S. Cl.
CPC .................. *G11C 7/22* (2013.01); *G06F 7/00* (2013.01); *G06F 21/73* (2013.01); *G11C 7/062* (2013.01);
(Continued)

(58) Field of Classification Search
CPC .. G11C 7/22; G11C 7/062; G11C 7/12; G11C 7/24; G11C 11/5642; G11C 16/045;
(Continued)

(56) References Cited

U.S. PATENT DOCUMENTS

| 5,798,669 A | * | 8/1998 | Klughart | ................. G05F 3/242 |
| | | | | 323/313 |
| 5,956,219 A | * | 9/1999 | Maloney | ................. H02H 9/046 |
| | | | | 361/111 |

(Continued)

FOREIGN PATENT DOCUMENTS

TW    200952300    12/2009

OTHER PUBLICATIONS

Taiwan Intellectual Property Office, "Office Action", dated Sep. 6, 2018.

*Primary Examiner* — Zeev V Kitov
(74) *Attorney, Agent, or Firm* — WPAT, PC (57) ABSTRACT

An ESD circuit is connected with a pad. The ESD circuit includes a voltage divider, a RC circuit and a path control circuit. The voltage divider is connected between the pad and a first node and provides plural divided voltages. The RC circuit is connected between the pad and the first node. The RC circuit receives the plural divided voltages and provides a control circuit. The path control circuit is connected with the pad and the first node. The path control circuit receives the plural divided voltages and the control voltage. When the pad receives a first ESD zap, the RC circuit controls the path control circuit to turn on a first ESD current path. Consequently, an ESD current flows from the pad to the first node through the first ESD current path.

9 Claims, 9 Drawing Sheets

(51) Int. Cl.

| | | |
|---|---|---|
| G11C 7/12 | (2006.01) | |
| G06F 7/00 | (2006.01) | |
| G06F 21/73 | (2013.01) | |
| G11C 7/06 | (2006.01) | |
| G11C 7/24 | (2006.01) | |
| G11C 17/16 | (2006.01) | |
| G11C 17/18 | (2006.01) | |
| H04L 9/08 | (2006.01) | |
| H01L 27/06 | (2006.01) | |
| H01L 27/112 | (2006.01) | |
| G11C 16/34 | (2006.01) | |
| G11C 29/44 | (2006.01) | |
| G11C 16/08 | (2006.01) | |
| G11C 16/24 | (2006.01) | |
| G11C 16/26 | (2006.01) | |
| G11C 16/32 | (2006.01) | |
| G11C 11/56 | (2006.01) | |
| G11C 16/04 | (2006.01) | |
| G11C 16/06 | (2006.01) | |
| G11C 16/10 | (2006.01) | |
| G11C 16/14 | (2006.01) | |

(52) U.S. Cl.
CPC ............... *G11C 7/12* (2013.01); *G11C 7/24* (2013.01); *G11C 11/5642* (2013.01); *G11C 16/045* (2013.01); *G11C 16/08* (2013.01); *G11C 16/24* (2013.01); *G11C 16/26* (2013.01); *G11C 16/32* (2013.01); *G11C 16/34* (2013.01); *G11C 17/16* (2013.01); *G11C 17/18* (2013.01); *G11C 29/44* (2013.01); *H01L 27/0629* (2013.01); *H01L 27/11206* (2013.01); *H02H 9/04* (2013.01); *H04L 9/0866* (2013.01); *G11C 7/06* (2013.01); *G11C 16/06* (2013.01); *G11C 16/10* (2013.01); *G11C 16/14* (2013.01)

(58) Field of Classification Search
CPC ......... G11C 16/08; G11C 16/24; G11C 16/26; G11C 16/32; G11C 16/34; G11C 17/16; G11C 17/18; G11C 29/44; G11C 27/0629; H02H 9/04; H01L 27/11206; G06F 7/00; G06F 21/73
USPC ........................................................... 361/56
See application file for complete search history.

(56) References Cited

U.S. PATENT DOCUMENTS

| | | |
|---|---|---|
| 7,027,276 B2 | 4/2006 | Chen |
| 7,660,087 B2* | 2/2010 | Huang .................. H02H 9/046 361/56 |
| 9,895,883 B1* | 2/2018 | Seto ...................... B41J 2/04543 |
| 2013/0215540 A1* | 8/2013 | Wang .................... H02H 9/046 361/56 |
| 2013/0229736 A1* | 9/2013 | Van Der Borght .... H02H 9/044 361/56 |
| 2015/0288173 A1* | 10/2015 | Chen ................... H01L 27/0248 361/56 |

\* cited by examiner

ELECTROSTATIC DISCHARGE CIRCUIT

This application claims the benefit of U.S. provisional application Ser. No. 62/490,612, filed Apr. 27, 2017, the disclosure of which is incorporated by reference herein in its entirety.

FIELD OF THE INVENTION

The present invention relates to a circuit, and more particularly to an electrostatic discharge (ESD) circuit.

BACKGROUND OF THE INVENTION

For increasing the operating speed and integration level of integrated circuits, the sizes of the semiconductor devices are gradually decreased. For example, as the size of a CMOS IC is gradually decreased, the gate oxide layer becomes thinner and thinner. Consequently, the breakage voltage of the gate oxide layer is reduced, and the breakage voltage at the PN junction of the semiconductor device is also reduced.

As known, during the manufacturing process of the integrated circuit, an ESD zapping effect may lead to damage of the integrated circuit. For avoiding the ESD zapping effect, the integrated circuit is usually equipped with an ESD circuit. The ESD circuit provides an ESD current path. Since the ESD current flows through the ESD current path, the internal circuit of the integrated circuit is not damaged by the ESD current.

SUMMARY OF THE INVENTION

An embodiment of the present invention provides an ESD circuit. The ESD circuit is connected with a pad. The ESD circuit includes a voltage divider, a RC circuit and a path control circuit. The voltage divider is connected between the pad and a first node and provides plural divided voltages. The RC circuit is connected between the pad and the first node. The RC circuit receives the plural divided voltages and provides a control voltage. The path control circuit is connected with the pad and the first node. The path control circuit receives the plural divided voltages and the control voltage. When the pad receives a first ESD zap, the RC circuit controls the path control circuit to turn on a first ESD current path. Consequently, an ESD current flows from the pad to the first node through the first ESD current path.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

During a program cycle of a nonvolatile memory, a program voltage is provided to the nonvolatile memory to program the cells of the nonvolatile memory. Similarly, during an erase cycle of a nonvolatile memory, an erase voltage is provided to the nonvolatile memory to erase the cells of the nonvolatile memory.

Generally, the program voltage or the erase voltage is very close to the withstanding voltage of the semiconductor device but is not high enough to destroy the semiconductor device. For example, a semiconductor device of the nonvolatile memory is a MOS transistor. The operating voltage of the MOS transistor is 1.8V, and the program voltage of the MOS transistor is 6V. The MOS transistor can withstand the voltage stress of 6V. If the voltage stress is increased to 7V or higher, the MOS transistor is possibly damaged.

For solving the above drawbacks, it is necessary to install an ESD circuit in the nonvolatile memory. The turn-on threshold voltage of the ESD circuit is slightly higher than 6V and close to 6V. When the ESD zapping effect occurs in the nonvolatile memory, the ESD current can be dissipated away through the ESD circuit. Consequently, the internal circuit of the nonvolatile circuit can be protected.

Figure 1:
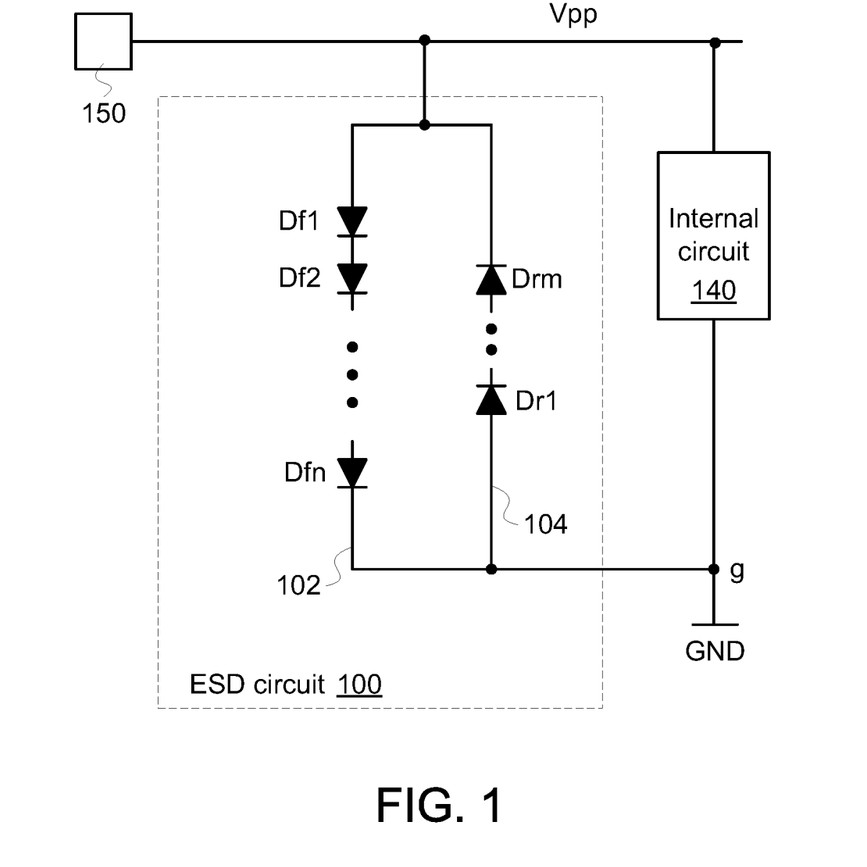
FIG. 1 is a schematic circuit diagram illustrating an ESD circuit according to a first embodiment of the present invention.

FIG. 1 is a schematic circuit diagram illustrating an ESD circuit according to a first embodiment of the present invention. The ESD circuit 100 and an internal circuit 140 are connected between a pad 150 of a first supply voltage Vpp and a node g of a second supply voltage GND. The first supply voltage Vpp is transmitted from the pad 150 to the ESD circuit 100 and the internal circuit 140. The second supply voltage GND is transmitted to the ESD circuit 100 and the internal circuit 140 through the node g.

The ESD circuit 100 comprises a first ESD current path 102 and a second ESD current path 104. The first ESD current path 102 comprises n diodes Df1~Dfn. The n diodes Df1~Dfn are connected between the first supply voltage Vpp and the second supply voltage GND in series. The second ESD current path 104 comprises m diodes Dr1~Drm. The m diodes Dr1~Drm are connected between the first supply voltage Vpp and the second supply voltage GND in series. In an embodiment, the second supply voltage GND is 0V.

The turn-on threshold voltage of the first ESD current path 102 can be expressed as n×Von, wherein Von is a cut-in voltage of the diode. For example, the cut-in voltage Von is 0.7V. If the voltage difference (Vpp−0V) between the first supply voltage Vpp and the second supply voltage GND is higher than n×Von, the first ESD current path 102 is turned on.

As mentioned above, the set value of the turn-on threshold voltage (n×Von) of the first ESD current path 102 must be higher than the first supply voltage Vpp (e.g., 6V). If the set value of the turn-on threshold voltage (n×Von) is lower than the first supply voltage Vpp (e.g., 6V), the first ESD current path 102 is mis-triggered. Similarly, the set value of the turn-on threshold voltage (n×Von) of the first ESD current path 102 must be lower than the total breakage voltage (m×Vbj) of the second ESD current path 104, wherein Vbj is a breakdown voltage of each diode. If the set value of the turn-on threshold voltage (n×Von) of the first ESD current path 102 is higher than the total breakage voltage (m×Vbj) of the second ESD current path 104, the second ESD current path 104 is mis-triggered and the diode breakdown will happen. If a positive ESD zap is received by the pad 150, the first ESD current path 102 is turned on immediately. Consequently, the diodes of the second ESD current path 104 will not be suffered from breakage.

Similarly, the turn-on threshold voltage of the second ESD current path 104 can be expressed as m×Von. If the voltage difference (0V−Vpp) between the second supply voltage GND and the first supply voltage Vpp is higher than m×Von, the second ESD current path 104 is turned on.

For example, the cut-in voltage Von of the diode is 0.7V, the breakdown voltage Vbj of the diode is 4V, and the operating voltage of the internal circuit 140 is in the range between 0V and 6V. That is, the first ESD current path 102 needs to comprise at least 9 serially-connected diodes (9×0.7V=6.3V), and the second ESD current path 104 needs to comprise at least 2 serially-connected diodes (2×4V=8V). Consequently, the first ESD current path 102 or the second ESD current path 104 is not mis-triggered.

Due to the process variation, the cut-in voltage Von of the diode is possibly subjected to a change. For avoiding the change of the cut-in voltage Von of the diode, an additional diode is added to the first ESD current path 102. Consequently, in the normal working state of the ESD circuit 100, the first ESD current path 102 is not mis-triggered.

If a positive ESD zap is received by the pad 150, the first ESD current path 102 is turned on. Meanwhile, the ESD current flows from the pad 150 to the node g through the first ESD current path 102. Whereas, if a negative ESD zap is received by the pad 150, the second ESD current path 104 is turned on. Meanwhile, the ESD current flows from the node g to the pad 150 through the second ESD current path 104.

Figure 2A:
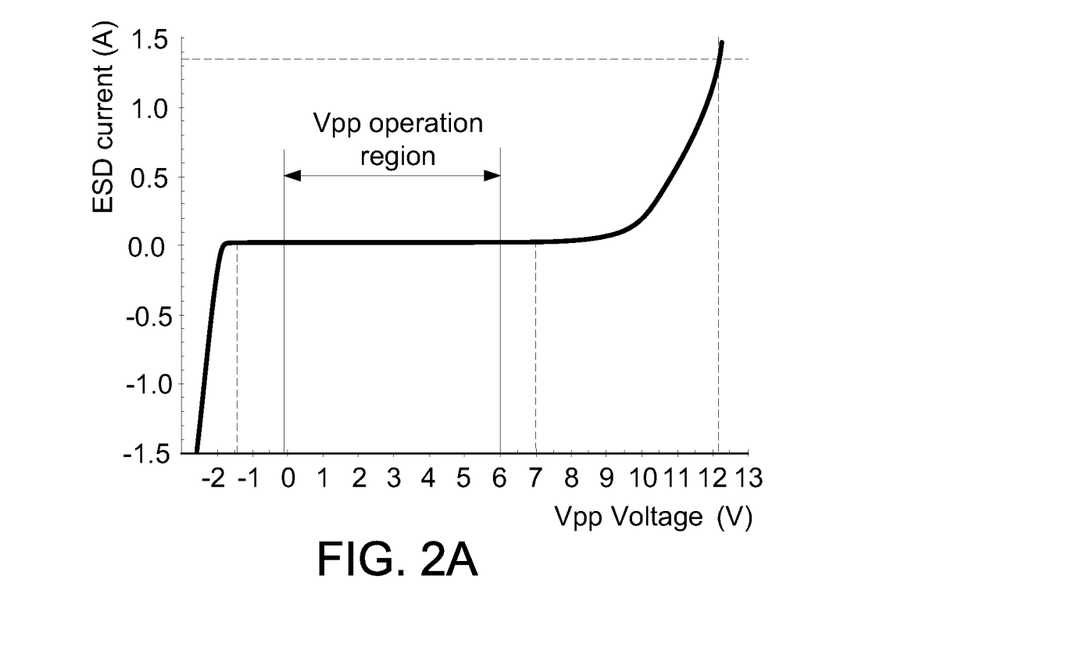
FIG. 2A is a plot illustrating the relationship between the voltage and the current of the ESD circuit according to the first embodiment of the present invention.

FIG. 2A is a plot illustrating the relationship between the voltage and the current of the ESD circuit according to the first embodiment of the present invention. In this embodiment, the first ESD current path 102 comprises 10 serially-connected diodes (i.e., n=10), and the second ESD current path 104 comprises 2 serially-connected diodes (i.e., n=2). Moreover, the operation region of the first supply voltage Vpp is 0V~6V. If the first supply voltage Vpp received by the internal circuit 140 is in the range between 0V and 6V, the ESD circuit 100 can protect the internal circuit 140.

If the first supply voltage Vpp is higher than 6V or the first supply voltage Vpp is lower than 0V, the ESD zapping effect possibly occurs. Consequently, the ESD circuit 100 is operated according to the change of the first supply voltage Vpp. When the first supply voltage Vpp is increased to 7V, the ESD current reaches 1 μA. Meanwhile, it is considered that the first ESD current path 102 is turned on. When the first supply voltage Vpp is decreased to −1.4V, the ESD current reaches −1 μA. Meanwhile, it is considered that the second ESD current path 104 is turned on.

Figure 2B:
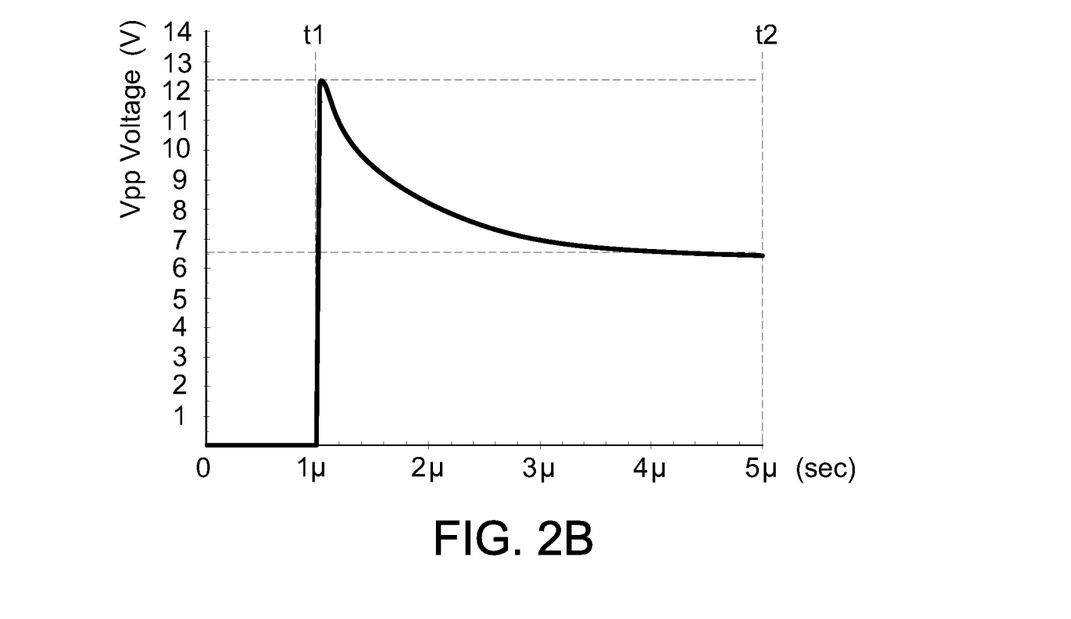
FIG. 2B is a plot illustrating the relationship between the voltage and the current of the ESD circuit according to the first embodiment of the present invention when the HBM test is performed.

FIG. 2B is a plot illustrating the relationship between the voltage and the current of the ESD circuit according to the first embodiment of the present invention when the HBM test is performed. Take a human body mode (HBM) test for example. When an electrostatic voltage of 2 KV is applied to the pad 150, the first supply voltage Vpp is increased to 12V and the ESD current is increased to 1.33 A. Consequently, the first ESD current path 102 is turned on, and the ESD current is transferred to the node g through the first ESD current path 102.

Please refer to FIG. 2B again. At the time point t1, the electrostatic voltage of 2 KV is received by the pad 150. The first supply voltage Vpp is increased to 12V in a very short time. Consequently, the first ESD current path 102 is turned on. Moreover, as shown in FIG. 2A, the ESD current is 1.33 A at the time point t1.

Since the first ESD current path 102 is turned on, the first supply voltage Vpp is decreased to below 7V at the time point t2. That is, the first supply voltage Vpp is decreased to below 7V within 4 μs by the ESD circuit 100. Consequently, the semiconductor device in the internal circuit is protected from damage.

Moreover, the ESD current possibly flows through the first ESD current path 102 or the second ESD current path 104. For preventing the ESD current to burn out the diodes Df1~Dfn and Dr1~Drm, the sizes of the diodes Df1~Dfn and Dr1~Drm should be large enough. However, due to the large sizes of the diodes Df1~Dfn and Dr1~Drm, the parasitic resistance is reduced. Consequently, the standby leakage current is increased. Generally, as the numbers n and m of the serially-connected diodes in the first ESD current path 102 and the second ESD current path 104 are increased, the magnitude of the standby leakage current is decreased. However, the increases of the numbers n and m influence the turn-on threshold voltages of the first ESD current path 102 and the second ESD current path 104. Meanwhile, it is necessary to judge whether the turn-on threshold voltage (n×Von) and the total breakage voltage (m×Vbj) are feasible.

As shown in FIG. 2B, the first supply voltage Vpp is decreased to a voltage level lower than 7V after the ESD zapping effect is eliminated. However, since the first supply voltage Vpp is maintained at a level near 7V for a certain time period, the semiconductor device in the internal circuit 140 is still influenced by the voltage stress of 7V. Consequently, the characteristics of the semiconductor device are deteriorated, and the use life of the semiconductor device is reduced.

Figure 3:
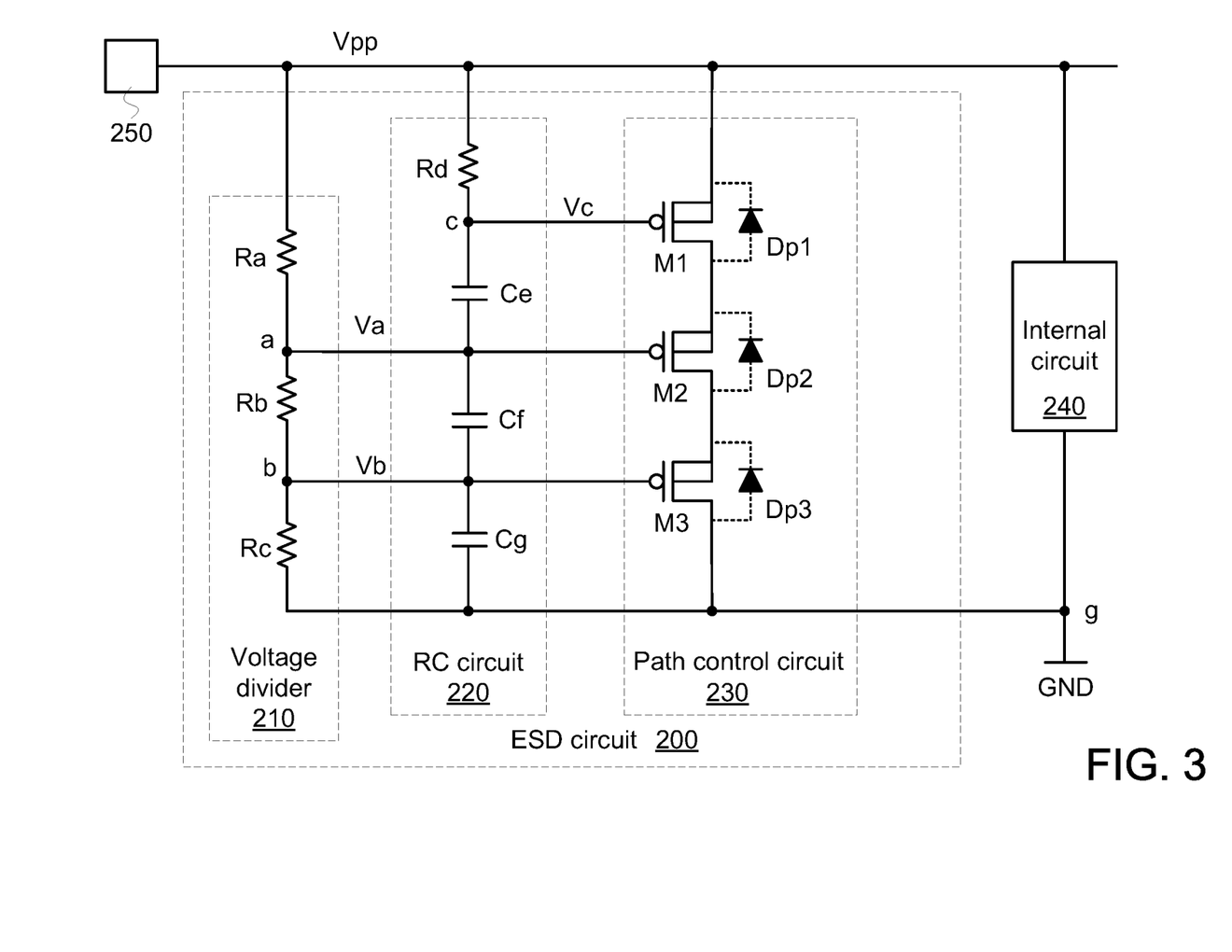
FIG. 3 is a schematic circuit diagram illustrating an ESD circuit according to a second embodiment of the present invention.

FIG. 3 is a schematic circuit diagram illustrating an ESD circuit according to a second embodiment of the present invention. The ESD circuit 200 and an internal circuit 240 are connected between a pad 250 of a first supply voltage Vpp and a node g of a second supply voltage GND. The first supply voltage Vpp is transmitted from the pad 250 to the ESD circuit 200 and the internal circuit 240. The second supply voltage GND is transmitted to the ESD circuit 200 and the internal circuit 240 through the node g.

In this embodiment, the ESD circuit 200 comprises a voltage divider 210, a RC circuit 220 and a path control circuit 230.

The voltage divider 210 comprises plural resistors Ra, Rb and Rc, which are connected between the pad 250 and the node g. The resistor Ra is connected between the pad 250 and the node a. The resistor Rb is connected between the node a and the node b. The resistor Rc is connected between the node b and the node g. The node a generates a divided voltage Va. The node b generates a divided voltage Vb. Moreover, the divided voltage Va is higher than the divided voltage Vb.

In an embodiment, the first supply voltage Vpp is 6V, and the second supply voltage GND is 0V. The resistance values of the resistors Ra, Rb and Rc are equal. Consequently, the divided voltage Va is 4V, and the divided voltage Vb is 2V. In some other embodiments, the resistance values of the resistors Ra, Rb and Rc are different.

The RC circuit 220 comprises a resistor Rd and plural capacitors Ce, Cf and Cg, which are connected with each other in series. The resistor Rd is connected between the pad 250 and the node c. The capacitor Ce is connected between the node c and the node a. The capacitor Cf is connected between the node a and the node b. The capacitor Cg is connected between the node b and the node g.

The path control circuit 230 comprises plural P-type transistors M1, M2 and M3. A first drain/source terminal and a body terminal of the P-type transistor M1 are connected with the pad 250. A gate terminal of the P-type transistor M1 is connected with the node c. A first drain/source terminal and a body terminal of the P-type transistor M2 are connected with a second drain/source terminal of the P-type transistor M1. A gate terminal of the P-type transistor M2 is connected with the node a. A first drain/source terminal and a body terminal of the P-type transistor M3 are connected with a second drain/source terminal of the P-type transistor M2. A gate terminal of the P-type transistor M3 is connected with the node b. A second drain/source terminal of the P-type transistor M3 is connected with the node g.

Moreover, the P-type transistors M1, M2 and M3 have parasitic diodes Dp1, Dp2 and Dp3, respectively. A cathode terminal of the parasitic diode Dp1 is connected with the body terminal of the P-type transistor M1. An anode terminal of the parasitic diode Dp1 is connected with the second drain/source terminal of the P-type transistor M1. A cathode terminal of the parasitic diode Dp2 is connected with the body terminal of the P-type transistor M2. An anode terminal of the parasitic diode Dp2 is connected with the second drain/source terminal of the P-type transistor M2. A cathode terminal of the parasitic diode Dp3 is connected with the body terminal and the first drain/source terminal of the P-type transistor M3. An anode terminal of the parasitic diode Dp3 is connected with the second drain/source terminal of the P-type transistor M3. That is, the three parasitic diodes Dp1, Dp2 and Dp3 are serially connected between the pad 250 and the node g.

In this embodiment, a first ESD current path is defined by the first drain/source terminal of the P-type transistor M1, a channel region of the P-type transistor M1, the second drain/source terminal of the P-type transistor M1, the first drain/source terminal of the P-type transistor M2, a channel region of the P-type transistor M2, the second drain/source terminal of the P-type transistor M2, the first drain/source terminal of the P-type transistor M3, a channel region of the P-type transistor M3 and the second drain/source terminal of the P-type transistor M3. The on/off states of the first ESD current path is controlled by the RC circuit 220.

Moreover, a second ESD current path is defined by the second drain/source terminal of the P-type transistor M3, the parasitic diode Dp3, the first drain/source terminal of the P-type transistor M3, the second drain/source terminal of the P-type transistor M2, the parasitic diode Dp2, the first drain/source terminal of the P-type transistor M2, the second drain/source terminal of the P-type transistor M1, the parasitic diode Dp1 and the first drain/source terminal of the P-type transistor M1. For example, the turn-on threshold voltage of the second ESD current path is 2.1V (=3×0.7V). If the voltage difference (0V–Vpp) between the second supply voltage GND and the first supply voltage Vpp is higher than 2.1V, the second ESD current path is turned on. The operations of the ESD circuit 200 will be described as follows.

In case that the first supply voltage Vpp is 6V and the second supply voltage GND is 0V, the divided voltage Va is 4V and the divided voltage Vb is 2V.

The node c of the RC circuit 220 generates a control voltage Vc. The control voltage Vc is equal to Vpp (6V). The voltage difference across the capacitor Ce is 2V (=6V−4V). The voltage difference across the capacitor Cf is 2V (=4V−2V). The voltage difference across the capacitor Cg is 2V (=2V−0V).

The gate terminal of the P-type transistor M1 of the path control circuit 230 receives the control voltage Vc (6V) from the node c. The gate terminal of the P-type transistor M2 receives the divided voltage Va (4V). The gate terminal of the P-type transistor M3 receives the divided voltage Vb (2V). Since the P-type transistors M1, M2 and M3 are turned off, the first ESD current path is turned off.

Since the first supply voltage Vpp is 6V and the second supply voltage GND is 0V, the serially-connected parasitic diodes Dp1, Dp2 and Dp3 are turned off. Meanwhile, the second ESD current path is turned off.

As mentioned above, both of the first ESD current path and the second ESD current path are turned off when the first supply voltage Vpp is 6V and the second supply voltage GND is 0V. Since the first supply voltage Vpp is provided to the internal circuit 240, the internal circuit 240 can be normally operated.

Figure 4A:
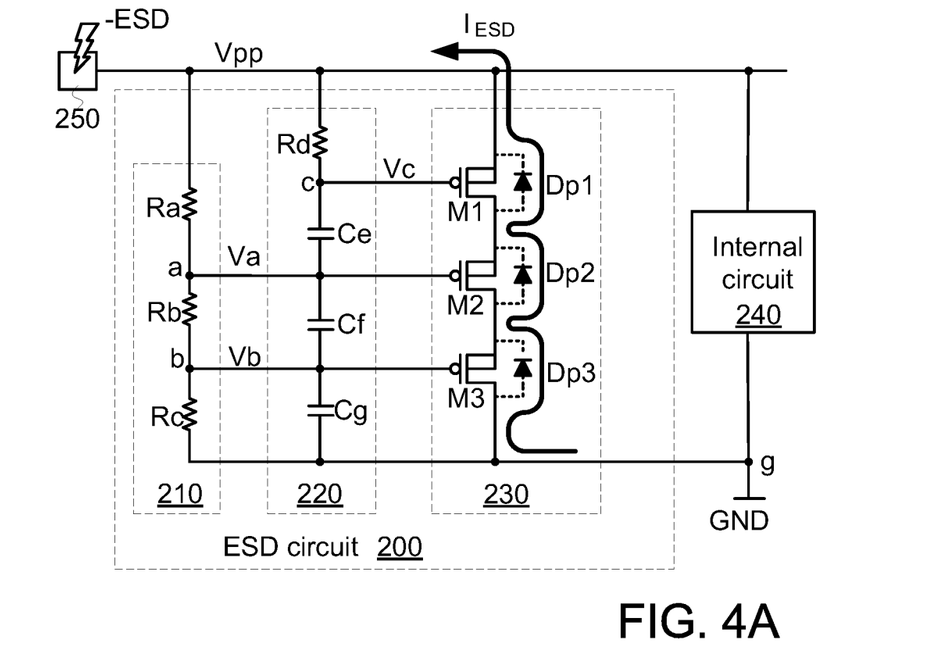
FIG. 4A is a schematic circuit diagram illustrating the ESD circuit of the second embodiment when a negative ESD zap is received.

FIG. 4A is a schematic circuit diagram illustrating the ESD circuit of the second embodiment when a negative ESD zap is received. When the negative ESD zap is received by the pad 250, the second ESD current path is turned on. Consequently, the ESD current $I_{ESD}$ flows from the node g to the pad 250 through the parasitic diodes Dp1, Dp2 and Dp3.

Figure 4B:
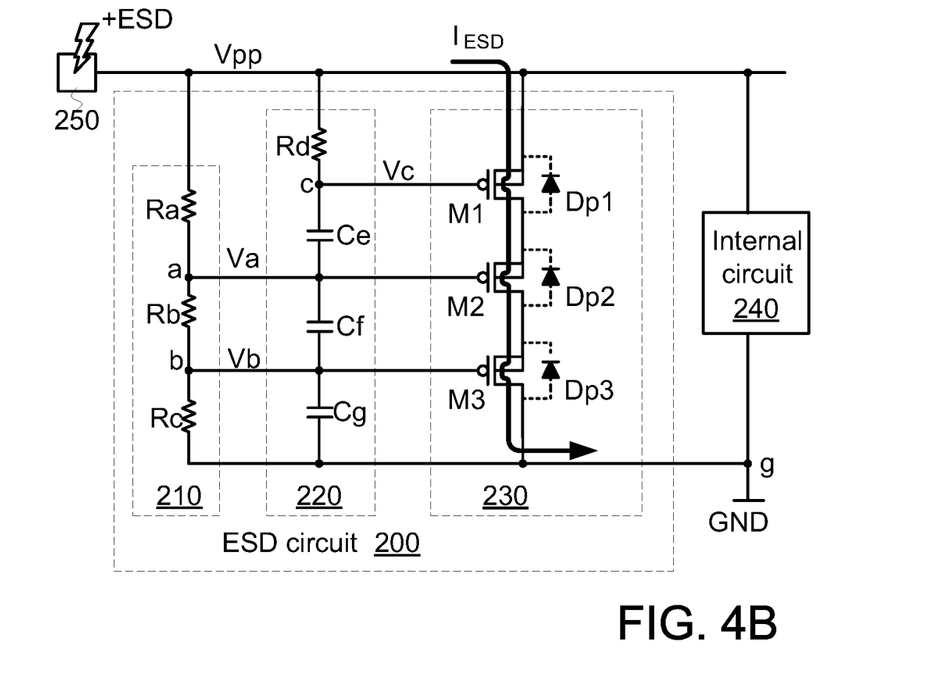
FIG. 4B is a schematic circuit diagram illustrating the ESD circuit of the second embodiment when a positive ESD zap is received.

FIG. 4B is a schematic circuit diagram illustrating the ESD circuit of the second embodiment when a positive ESD zap is received. When the positive ESD zap is received by the pad 250, the first supply voltage Vpp is increased rapidly. Consequently, the capacitors Ce, Cf and Cg are temporarily in the short-circuited state. Since the gate terminals of the P-type transistors M1, M2 and M3 receives the second supply voltage GND (0V), the P-type transistors M1, M2 and M3 are turned on. Meanwhile, the first ESD current path is turned on. That is, when the positive ESD zap is received by the pad 250, the first ESD current path is turned on. Under this circumstance, an ESD current $I_{ESD}$ flows from the pad 250 to the node g through the P-type transistors M1, M2 and M3.

In an embodiment, the RC constant of the RC circuit 220 is 1 μs. After the first ESD current path has been turned on for 1 μs, the capacitors Ce, Cf and Cg are charged to higher voltages again. Consequently, the P-type transistors M1, M2 and M3 are turned off. Meanwhile, the first ESD current path is turned off.

As mentioned above, the ESD current $I_{ESD}$ flows from the pad 250 to the node g through the P-type transistors M1, M2 and M3 in a 1 μs cycle when a positive ESD zap is received by the ESD circuit 200. Moreover, the operation region of the first supply voltage Vpp is 0V~6V. If the first supply voltage Vpp received by the internal circuit 240 is in the range between 0V and 6V after 1 us, the ESD circuit 200 is disabled.

Figure 5A:
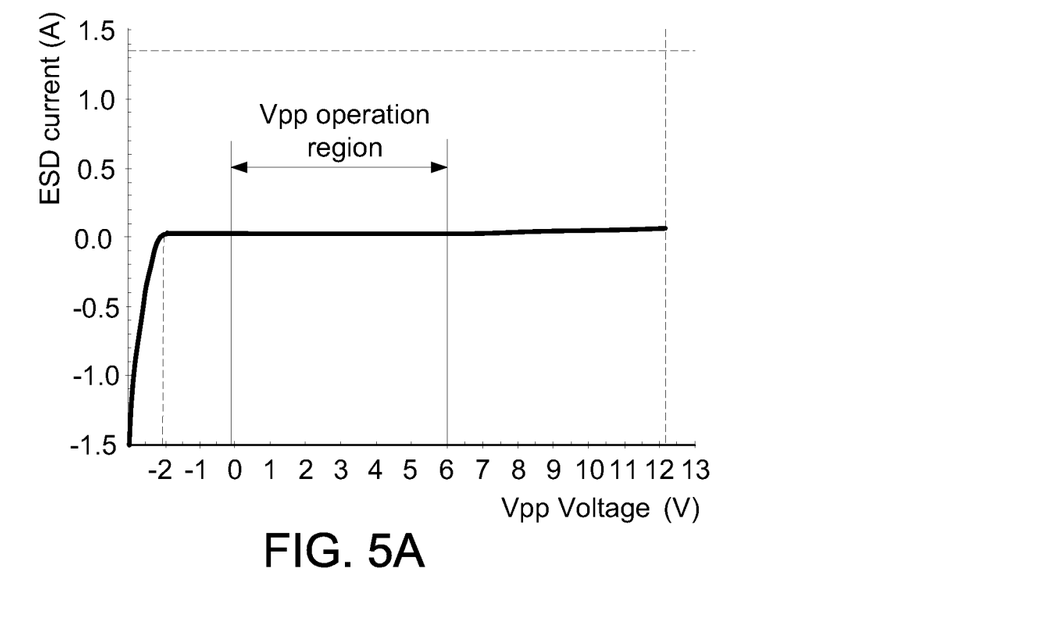
FIG. 5A is a plot illustrating the relationship between the voltage and the current of the ESD circuit according to the second embodiment of the present invention.

FIG. 5A is a plot illustrating the relationship between the voltage and the current of the ESD circuit according to the second embodiment of the present invention. If the first supply voltage Vpp is higher than 6V or the first supply voltage Vpp is lower than 0V, the ESD circuit 200 is operated according to the change of the first supply voltage Vpp. When the first supply voltage Vpp is decreased to −2.1V, the ESD current reaches −1 μA. Meanwhile, it is considered that the second ESD current path is turned on.

Figure 5B:
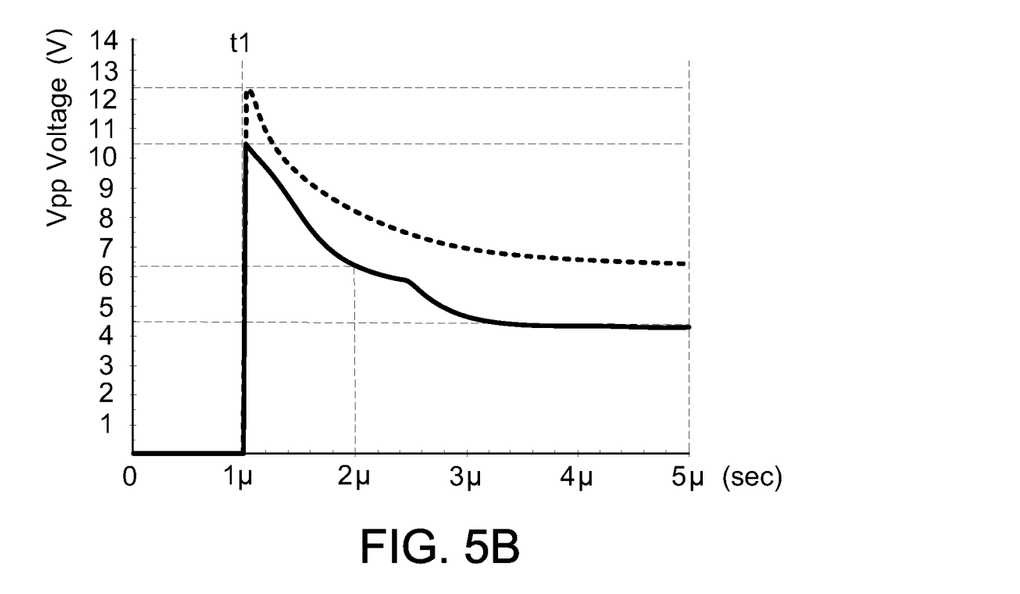
FIG. 5B is a plot illustrating the relationship between the voltage and the current of the ESD circuit according to the second embodiment of the present invention when the HBM test is performed.

FIG. 5B is a plot illustrating the relationship between the voltage and the current of the ESD circuit according to the second embodiment of the present invention when the HBM test is performed. Take a human body mode (HBM) test for example. When an electrostatic voltage of 2 KV is applied to the pad 250, the first supply voltage Vpp is increased rapidly. Consequently, the first ESD current path is turned on, and the ESD current is transferred to the node g through the first ESD current path. The dotted curve indicates that the first supply voltage Vpp is increased to 12V by the ESD circuit 100 of the first embodiment. The solid curve indicates first supply voltage Vpp is only increased to 10.5V by the ESD circuit 200 of this embodiment. The difference between the two curves is about 1.5V.

Please refer to FIG. 5B again. At the time point t1, the electrostatic voltage of 2 KV is received by the pad 250. The ESD current path is turned on in a very short time. Consequently, the peak voltage of the first supply voltage Vpp is only 10.5V.

Since the first ESD current path is turned on, the first supply voltage Vpp is decreased to the voltage level lower than 6.5V within 1 μs by the ESD circuit 200. After 5 μs, the first supply voltage Vpp is further decreased to a voltage level near 4.5V by the ESD circuit 200 of this embodiment after the ESD zapping effect is eliminated. Since the first supply voltage Vpp is continued decreasing to the voltage lower than 4.5V, the semiconductor device in the internal circuit 240 is not influenced. In other words, the discharge performance of the ESD circuit of this embodiment is enhanced.

Figure 6:
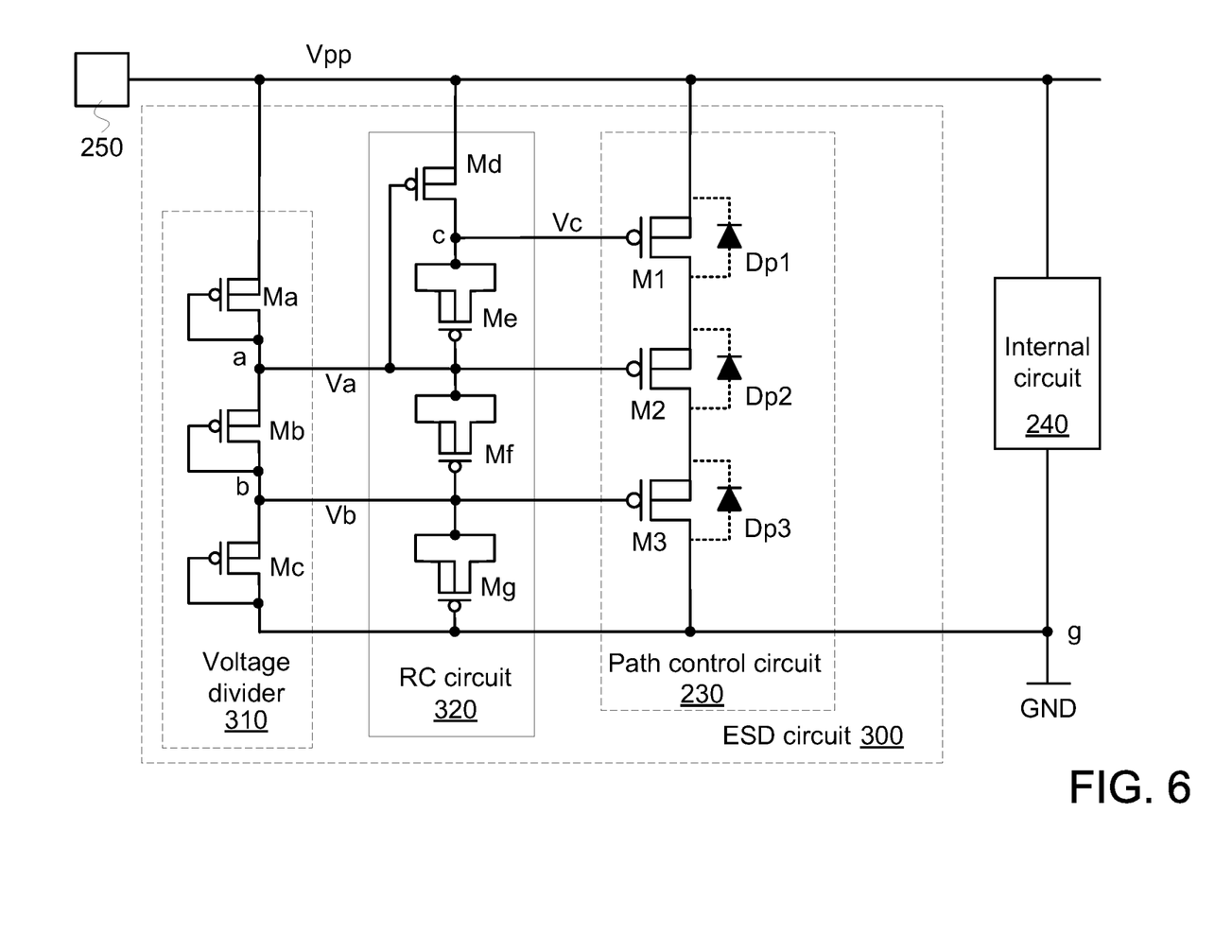
FIG. 6 is a schematic circuit diagram illustrating an ESD circuit according to a third embodiment of the present invention.

FIG. 6 is a schematic circuit diagram illustrating an ESD circuit according to a third embodiment of the present invention. In this embodiment, the ESD circuit 300 comprises a voltage divider 310, a RC circuit 320 and a path control circuit 230. The voltage divider 310 and the RC circuit 320 of the ESD circuit 300 are composed of transistors. Due to the connecting relationships between the transistors, some of the transistors have the resistive characteristics or the capacitive properties.

The voltage divider 310 comprises plural P-type transistors Ma, Mb and Mc. A first drain/source terminal and a body terminal of the P-type transistor Ma are connected with the pad 250. A second drain/source terminal and a gate terminal of the P-type transistor Ma are connected with the node a. A first drain/source terminal and a body terminal of the P-type transistor Mb are connected with the node a. A second drain/source terminal and a gate terminal of the P-type transistor Mb are connected with the node b. A first drain/source terminal and a body terminal of the P-type transistor Mc are connected with the node b. A second drain/source terminal and a gate terminal of the P-type transistor Mc are connected with the node g. Since the plural P-type transistors Ma, Mb and Mc are in diode connection, these transistors may be considered as resistors. Consequently, the node a generates a divided voltage Va, and the node b generates a divided voltage Vb. Moreover, the divided voltage Va is higher than the divided voltage Vb.

The RC circuit 320 comprises plural transistors Md, Me, Mf and Mg. A first drain/source terminal and a body terminal of the P-type transistor Md are connected with the pad 250. A gate terminal of the P-type transistor Md is connected with the node a. A second drain/source terminal of the P-type transistor Md is connected with the node c. Consequently, the P-type transistor Md may be considered as a resistor.

A first drain/source terminal, a second drain/source terminal and a body terminal of the P-type transistor Me are connected with the node c. A gate terminal of the P-type transistor Me is connected with the node a. A first drain/source terminal, a second drain/source terminal and a body terminal of the P-type transistor Mf are connected with the node a. A gate terminal of the P-type transistor Mf is connected with the node b. A first drain/source terminal, a second drain/source terminal and a body terminal of the P-type transistor Mg are connected with the node b. A gate terminal of the P-type transistor Mg is connected with the node g. Consequently, the P-type transistors Me, Mf and Mg may be considered as capacitors.

The operating principles of the ESD circuit 300 of this embodiment are similar to those of the second embodiment, and are not redundantly described herein. It is noted that numerous modifications and alterations may be made while retaining the teachings of the invention. For example, in another embodiment, the ESD circuit comprises the voltage divider 210 of the second embodiment, the RC circuit 320 of the third embodiment and the path control circuit 230. In a further embodiment, the ESD circuit comprises the voltage divider 310 of the third embodiment, the RC circuit 220 of the second embodiment and the path control circuit 230.

For effectively protecting the internal circuit 240 from the ESD zapping effect, the ESD circuit can be further modified.

Figure 7A:
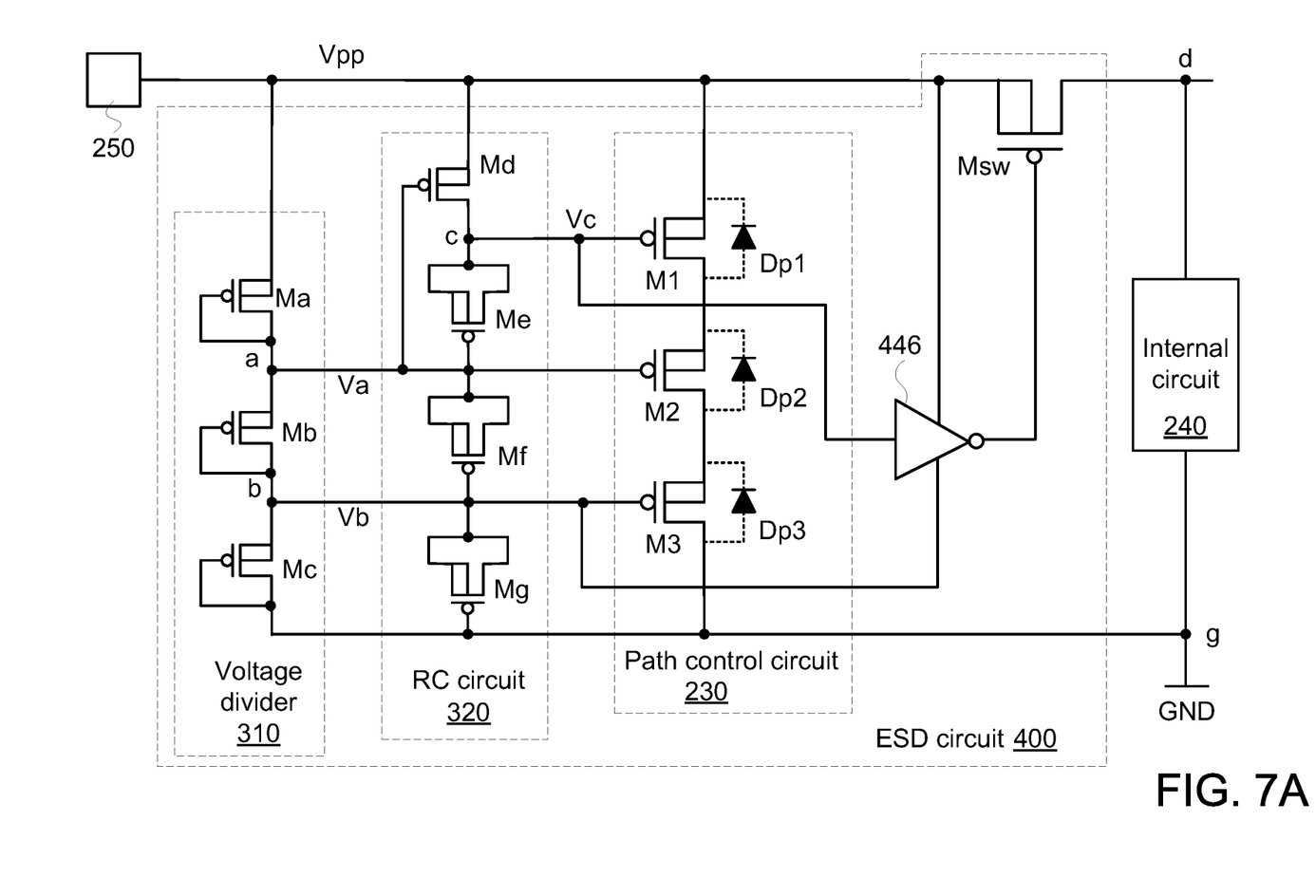
FIG. 7A is a schematic circuit diagram illustrating an ESD circuit according to a fourth embodiment of the present invention.

FIG. 7A is a schematic circuit diagram illustrating an ESD circuit according to a fourth embodiment of the present invention. In comparison with the ESD circuit of the third embodiment, the ESD circuit of this embodiment further comprises a switching transistor Msw and an inverter 446. The operations of the switching transistor Msw and the inverter 446 will be described as follows.

The input terminal of the inverter 446 is connected with the node c so as to receive the control voltage Vc. A first power terminal of the inverter 446 is connected with the pad 250 to receive the first supply voltage Vpp. A second power terminal of the inverter 446 is connected with the node b to receive the divided voltage Vb. A first drain/source terminal and a body terminal of the switching transistor Msw is connected with the pad 250. A second drain/source terminal of the switching transistor Msw is connected with the node d. A gate terminal of the switching transistor Msw is connected with the output terminal of the inverter 446.

In case that the first supply voltage Vpp provides the normal voltage (e.g., 6V), the divided voltage Va (e.g., 4V) connected to the gate terminal of the transistor Md, and the control voltage Vc may be considered as a high voltage level. Since the high voltage level is inputted into the inverter 446, a low voltage level is outputted from the inverter 446. For example, the low voltage level is equal to the divided voltage Vb (e.g., 2V). Since the gate terminal of the switching transistor Msw receives the low voltage level (e.g., 2V), the switching transistor Msw is turned on. Consequently, the pad 250 and the node d are connected with each other through the switching transistor Msw. Meanwhile, the first supply voltage Vpp can be transmitted to the internal circuit 240.

In case that the first supply voltage Vpp is interrupted, the gate terminal of the switching transistor Msw is in a floating state. Meanwhile, the switching transistor Msw is turned off. Consequently, the pad 250 and the node d are isolated from each other through the switching transistor Msw.

When the positive ESD zap is received by the pad 250, the first supply voltage Vpp is increased rapidly. Consequently, the capacitors composed of the transistors Me, Mf and Mg are temporarily in the short-circuited state. Meanwhile, the control voltage Vc is changed to a low voltage level GND. Since the low voltage level is inputted into the inverter 446, a high voltage level is outputted from the inverter 446. The high voltage level is equal to the first supply voltage Vpp. Since the gate terminal of the switching transistor Msw receives the high voltage level, the switching transistor Msw is turned off. Consequently, the pad 250 and the node d are isolated from each other through the switching transistor Msw. Under this circumstance, the ESD current cannot be transmitted to the internal circuit 240 through the switching transistor Msw.

Figure 7B:
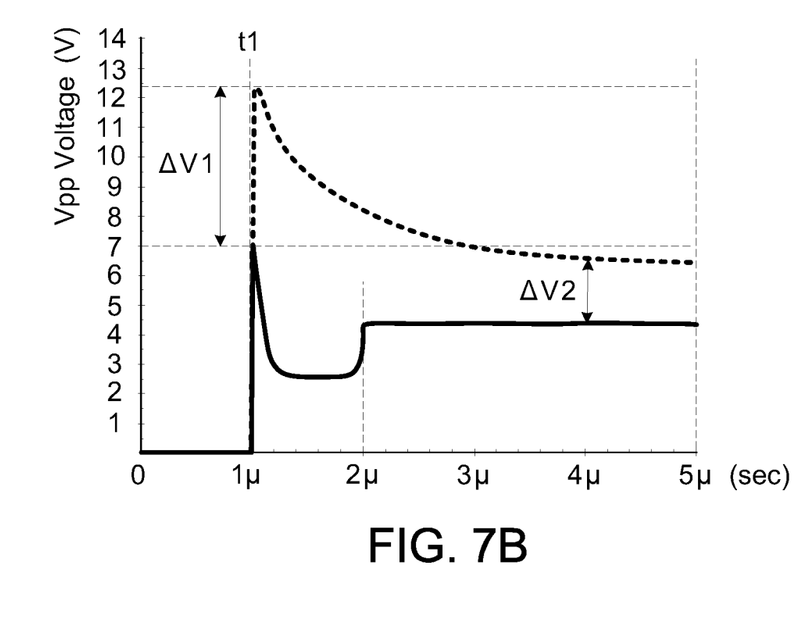
FIG. 7B is a plot illustrating the relationship between the voltage and the current of the ESD circuit at the node d according to the fourth embodiment of the present invention when the HBM test is performed.

FIG. 7B is a plot illustrating the relationship between the voltage and the current of the ESD circuit at the node d according to the fourth embodiment of the present invention when the HBM test is performed. Take a human body mode (HBM) test for example. When an electrostatic voltage of 2 KV is applied to the pad 250, the first ESD current path is turned on rapidly, and the ESD current is transferred to the node g through the first ESD current path in a very short time, thus the peak voltage received at node d is only 7V. The dotted curve indicates that the first supply voltage Vpp received by the Internal circuit 140 is increased to 12V by the ESD circuit 100 of the first embodiment. The solid curve indicates the voltage level of node d is only increased to 7.0V by the ESD circuit 400 of this embodiment. The difference ΔV1 between the two curves is about 5.0V.

Please refer to FIG. 7B again. At the time point t1, the electrostatic voltage of 2 KV is received by the pad 250. The first ESD current path is turned on in a very short time. Consequently, the voltage level of node d is only increased to 7.0V.

Since the first ESD current path is turned on, and the switching transistor Msw is turn off, the voltage level of node d is decreased to the voltage level lower than 4V within 1 μs by the ESD circuit 400. After 1 μs, the voltage level of node d is maintained at about 4.5V.

The dotted curve indicates that the first supply voltage Vpp received by the Internal circuit 140 is decreased to a voltage level lower than 6.5V by the ESD circuit 100 of the first embodiment after the ESD zapping effect is eliminated. The solid curve indicates that the voltage level of node d received by the Internal circuit 240 is maintained at a voltage level near 4.5V by the ESD circuit 400 of this embodiment after the ESD zapping effect is eliminated. The difference ΔV2 between the two curves is about 2.0V. Since the voltage level of node d is maintained at the voltage level near 4.5V, the semiconductor device in the internal circuit 240 is not influenced. In other words, the discharge performance of the ESD circuit of this embodiment is enhanced.

From the above descriptions, the ESD 400 can effectively protect the internal circuit 240 from the ESD zap. When the ESD zap is received, the first ESD current path or the second ESD current path is turned on. Moreover, the ESD current cannot be transmitted to the internal circuit 240 through the switching transistor Msw when the positive ESD zap is received.

Figure 8:
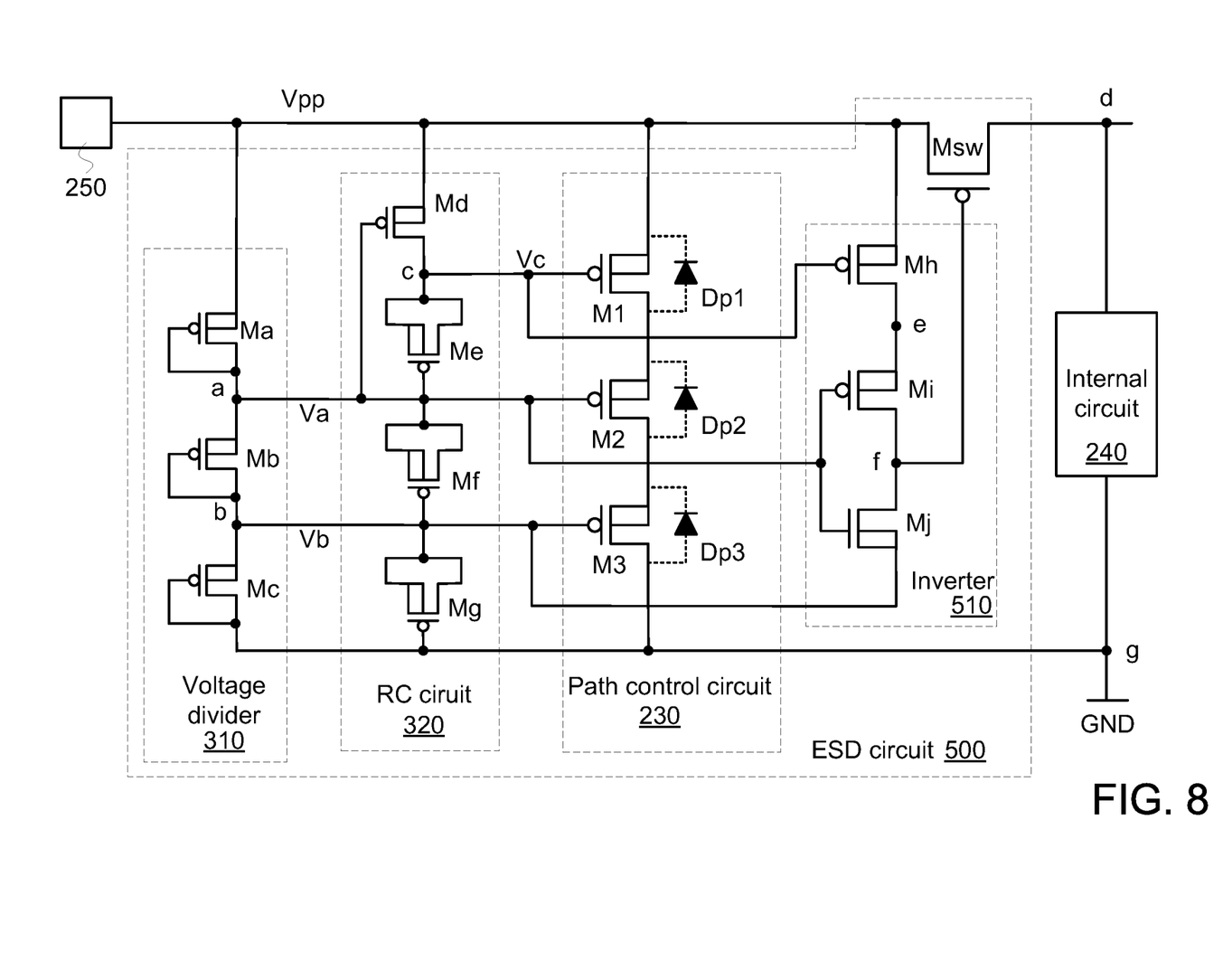
FIG. 8 is a schematic circuit diagram illustrating an ESD circuit according to a fifth embodiment of the present invention.

FIG. 8 is a schematic circuit diagram illustrating an ESD circuit according to a fifth embodiment of the present invention. In comparison with the ESD circuit of the fourth embodiment, the inverter 510 in the ESD circuit 500 of this embodiment is distinguished. The operations of the inverter 510 will be described as follows.

The inverter 510 comprises P-type transistors Mh, Mi and an N-type transistor Mj. A first drain/source terminal and a body terminal of the P-type transistor Mh are connected with the pad 250. A second drain/source terminal of the P-type transistor Mh is connected with the node e. A gate terminal of the P-type transistor Mh is connected with the node c to receive the control voltage Vc. A first drain/source terminal and a body terminal of the P-type transistor Mi are connected with the node e. A second drain/source terminal of the P-type transistor Mi is connected with the node f. A gate terminal of the P-type transistor Mi is connected with the node a so as to receive the divided voltage Va. A first drain/source terminal of the N-type transistor Mj is connected with the node f. A second drain/source terminal and a body terminal of the N-type transistor Mj is connected with the node b so as to receive the divided voltage Vb. A gate terminal of the N-type transistor Mj is connected with the node a so as to receive the divided voltage Va.

In case that the first supply voltage Vpp provides the normal voltage (e.g., 6V), the control voltage Vc at the node c is 6V and the divided voltage Va is 4V. Meanwhile, the P-type transistors Mh and Mi are turned off, and the N-type transistor Mj is turned on. Consequently, a low voltage level is outputted from the inverter 510. For example, the low voltage level is equal to the divided voltage Vb (e.g., 2V). Since the gate terminal of the switching transistor Msw receives the low voltage level (e.g., 2V), the switching transistor Msw is turned on. Consequently, the pad 250 and the node d are connected with each other through the switching transistor Msw. Meanwhile, the first supply voltage Vpp can be transmitted to the internal circuit 240.

When the positive ESD zap is received by the pad 250, the first supply voltage Vpp is increased rapidly. Consequently, the capacitors composed of the transistors Me, Mf and Mg are temporarily in the short-circuited state. Meanwhile, each of the control voltage Vc at the node c and the divided voltage Va is changed to a low voltage level GND. The low voltage level is inputted into the inverter 510. Meanwhile, the P-type transistors Mh and Mi are turned on, and the N-type transistor Mj is turned off. Consequently, a high voltage level is outputted from the inverter 510. The high voltage level is equal to the first supply voltage Vpp. Since the gate terminal of the switching transistor Msw receives the high voltage level, the switching transistor Msw is turned off. Consequently, the pad 250 and the node d are isolated from each other through the switching transistor Msw. Under this circumstance, the ESD current cannot be transmitted to the internal circuit 240 through the switching transistor Msw.

In the second embodiment, the third embodiment, the fourth embodiment and the fifth embodiment, the path control circuit 230 comprises three stacked MOS transistors. It is noted that numerous modifications and alterations may be made while retaining the teachings of the invention. For example, in another embodiment, the voltage divider provides more divided voltages to more stacked MOS transistors.

In another embodiment, the resistors of the voltage divider have higher resistance values. Consequently, the leakage current of the ESD circuit is effectively reduced. For increasing the discharging efficiency of the ESD circuit, the P-type transistors M1, M2 and M3 of the path control circuit are large-sized transistors. Similarly, in another embodiment, the switching transistor Msw is a large-sized transistor.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrostatic discharge (ESD) circuit connected with a pad, the ESD circuit comprising:
   a voltage divider connected between the pad and a first node and the voltage divider comprising a first resistor, a second resistor and a third resistor, wherein a first terminal of the first resistor is connected with the pad, a second terminal of the first resistor is connected with a second node, a first terminal of the second resistor is connected with the second node, a second terminal of the second resistor is connected with a third node, a first terminal of the third resistor is connected with the third node, a second terminal of the third resistor is connected with the first node, the second node outputs a first divided voltage, and the third node outputs a second divided voltage;
   a RC circuit connected between the pad and the first node and the RC circuit comprising a fourth resistor, a first capacitor, a second capacitor and a third capacitor, wherein a first terminal of the fourth resistor is connected with the pad, a second terminal of the fourth resistor is connected with a fourth node, a first terminal of the first capacitor is connected with the fourth node, a second terminal of the first capacitor is connected with the second node, a first terminal of the second capacitor is connected with the second node, a second terminal of the second capacitor is connected with the third node, a first terminal of the third capacitor is connected with the third node, a second terminal of the third capacitor is connected with the first node, and the fourth node outputs the control voltage; and
   a path control circuit connected with the pad and the first node, wherein the path control circuit receives the first divided voltage, the second divided voltage and the control voltage,
   wherein when the pad receives a positive ESD zap, the RC circuit controls the path control circuit to turn on a first ESD current path, so that an ESD current flows from the pad to the first node through the first ESD current path.

2. The ESD circuit as claimed in claim 1, wherein a first drain/source terminal and a body terminal of a first transistor are connected with each other and served as the first terminal of the first resistor, and a second drain/source terminal and a gate terminal of the first transistor are connected with each other and served as the second terminal of the first resistor, wherein a first drain/source terminal and a body terminal of a second transistor are connected with each other and served as the first terminal of the second resistor, and a second drain/source terminal and a gate terminal of the second transistor are connected with each other and served as the second terminal of the second resistor, wherein a first drain/source terminal and a body terminal of a third transistor are connected with each other and served as the first terminal of the third resistor, and a second drain/source terminal and a gate terminal of the third transistor are connected with each other and served as the second terminal of the third resistor.

3. The ESD circuit as claimed in claim 1, wherein a first drain/source terminal and a body terminal of a fourth transistor are connected with each other and served as the first terminal of the fourth resistor, a gate of the fourth transistor is connected with the second node, and a second drain/source terminal of the fourth transistor is served as the second terminal of the fourth resistor, wherein a first drain/source terminal, a second drain/source terminal and a body terminal of a fifth transistor are connected with each other and served as the first terminal of the first capacitor, and a gate terminal of the fifth transistor is served as the second terminal of the first capacitor, wherein a first drain/source terminal, a second drain/source terminal and a body terminal of a sixth transistor are connected with each other and served as the first terminal of the second capacitor, and a gate terminal of the sixth transistor is served as the second terminal of the second capacitor, wherein a first drain/source terminal, a second drain/source terminal and a body terminal of a seventh transistor are connected with each other and served as the first terminal of the third capacitor, and a gate terminal of the seventh transistor is served as the second terminal of the third capacitor.

4. The ESD circuit as claimed in claim 1, wherein the path control circuit comprises:
   an eighth transistor, wherein a first drain/source terminal and a body terminal of the eighth transistor are connected with the pad, and a gate terminal of the eighth transistor receives the control voltage;
   a ninth transistor, wherein a first drain/source terminal and a body terminal of the ninth transistor are connected with a second drain/source terminal of the eighth transistor, and a gate terminal of the ninth transistor receives the first divided voltage; and
   a tenth transistor, wherein a first drain/source terminal and a body terminal of the tenth transistor are connected with a second drain/source terminal of the ninth transistor, a gate terminal of the tenth transistor receives the second divided voltage, and a second drain/source terminal of the tenth transistor is connected with the first node.

5. The ESD circuit as claimed in claim 4, wherein the eighth transistor comprises a first parasitic diode, an anode terminal of the first parasitic diode is connected with the second drain/source terminal of the eighth transistor, and a cathode terminal of the first parasitic diode is connected with the body terminal of the eighth transistor, wherein the ninth transistor comprises a second parasitic diode, an anode terminal of the second parasitic diode is connected with the second drain/source terminal of the ninth transistor, and a cathode terminal of the second parasitic diode is connected with the body terminal of the ninth transistor, wherein the tenth transistor comprises a third parasitic diode, an anode terminal of the third parasitic diode is connected with the second drain/source terminal of the tenth transistor, and a cathode terminal of the third parasitic diode is connected with the body terminal of the tenth transistor.

6. The ESD circuit as claimed in claim 5, wherein the first ESD current path is defined by the first drain/source terminal of the eighth transistor, a channel region of the eighth transistor, the second drain/source terminal of the eighth transistor, the first drain/source terminal of the ninth transistor, a channel region of the ninth transistor, the second drain/source terminal of the ninth transistor, the first drain/source terminal of the tenth transistor, a channel region of the tenth transistor and the second drain/source terminal of the tenth transistor.

7. The ESD circuit as claimed in claim 1, further comprising a switching transistor, wherein the switching transistor is connected between the pad and an internal circuit, a first drain/source terminal and a body terminal of the switching transistor is connected with the pad, and a second drain/source terminal of the switching transistor is connected with the internal circuit.

8. The ESD circuit as claimed in claim 7, further comprising an inverter, wherein an input terminal of the inverter receives the control voltage, a first power terminal of the inverter is connected with the pad, a second power terminal of the inverter receive the second divided voltage, and an output terminal of the inverter is connected with a gate terminal of the switching transistor.

9. The ESD circuit as claimed in claim 7, further comprising an inverter wherein the inverter comprises:
  an eleventh transistor, wherein a first drain/source terminal and a body terminal of the eleventh transistor are connected with the pad, a gate terminal of the eleventh transistor receives the control voltage, and a second drain/source terminal of the eleventh transistor is connected with a fifth node;
  a twelfth transistor, wherein a first drain/source terminal and a body terminal of the twelfth transistor are connected with the fifth node, a gate terminal of the twelfth transistor receives the first divided voltage, and a second drain/source terminal of the twelfth transistor is connected with a sixth node; and
  a thirteenth transistor, wherein a first drain/source terminal and a body terminal of the thirteenth transistor are connected with the sixth node, a gate terminal of the thirteenth transistor receives the first divided voltage, and a second drain/source terminal of the thirteenth transistor receives the second divided voltage,
  wherein the sixth node is connected with a gate terminal of the switching transistor.

* * * * *